R. A. BRIGHT.
CIGAR MACHINE.
APPLICATION FILED FEB. 18, 1914.
1,260,137.
Patented Mar. 19, 1918.
9 SHEETS—SHEET 1.
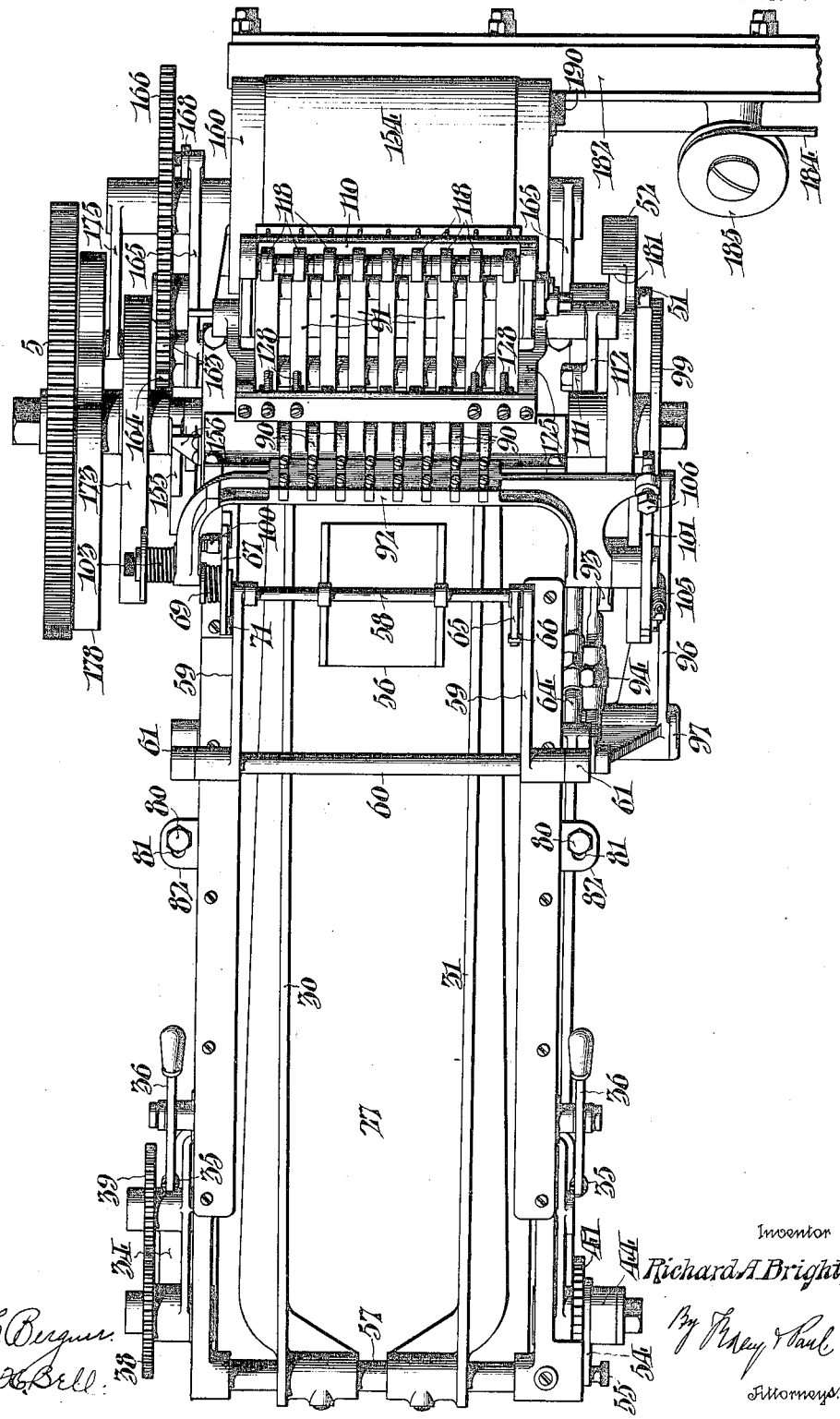
FIG. I.
Witnesses
John C. Bergner
James C. Bell
Inventor
Richard A. Bright,
By Riley & Paul
Attorneys.

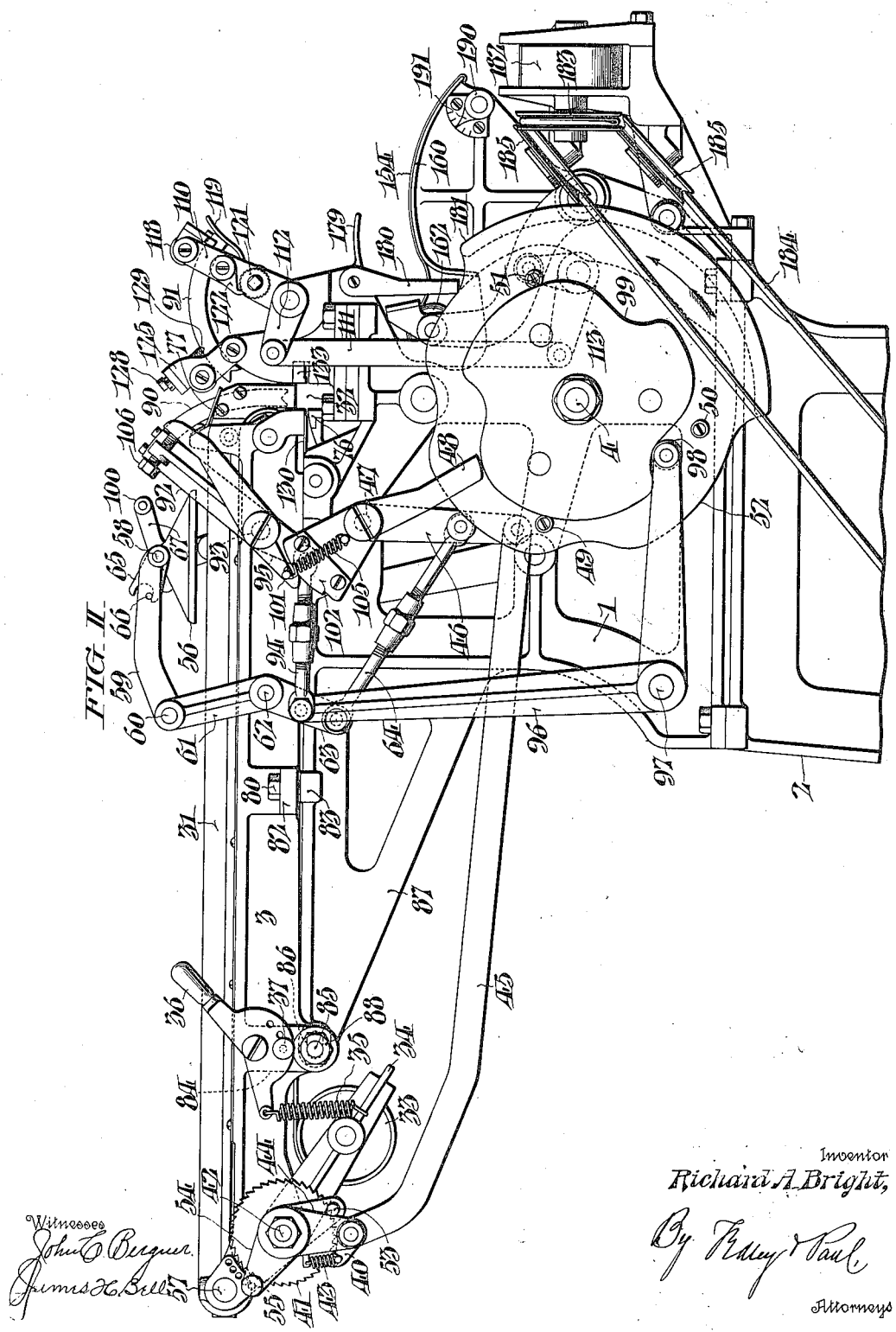

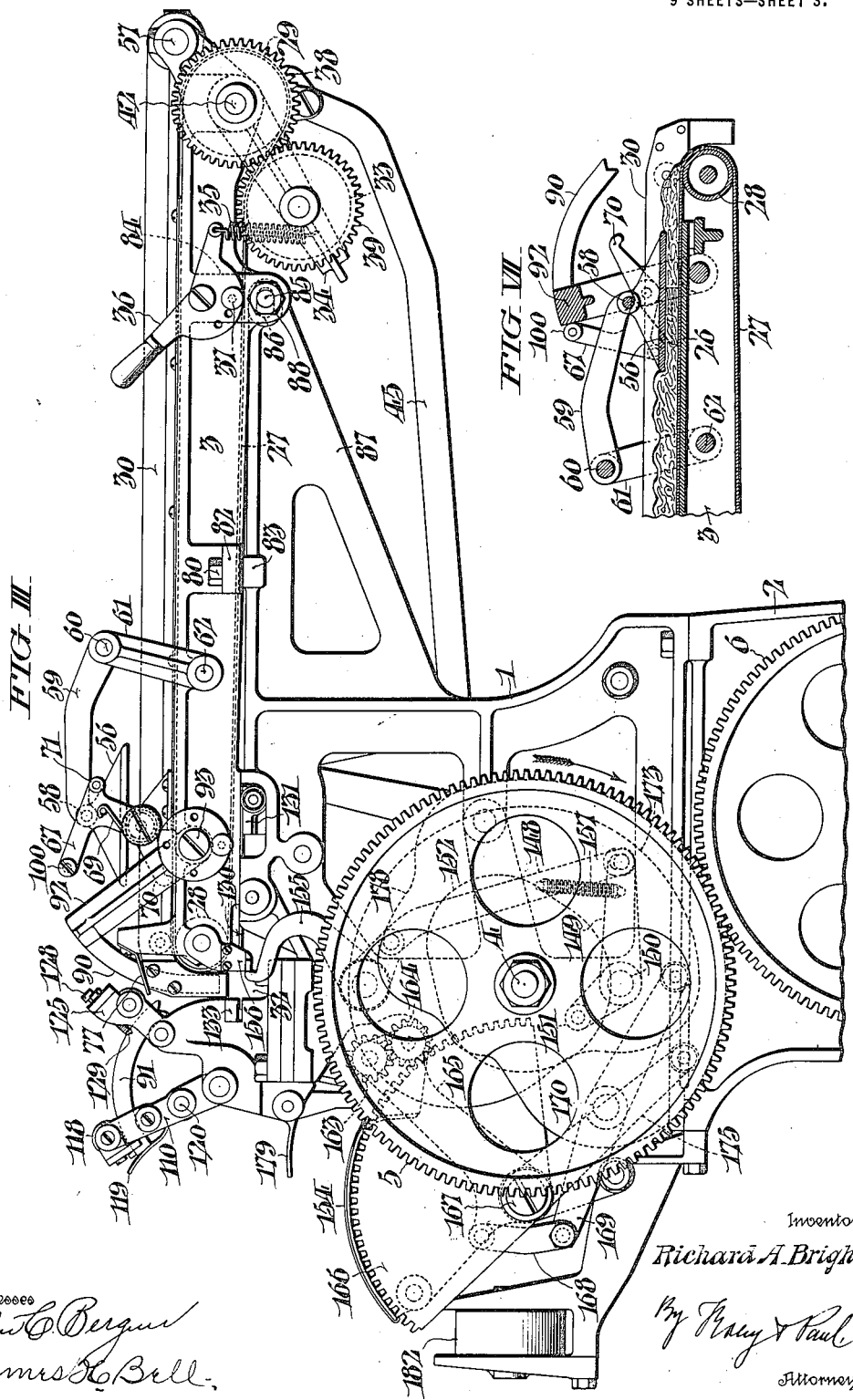

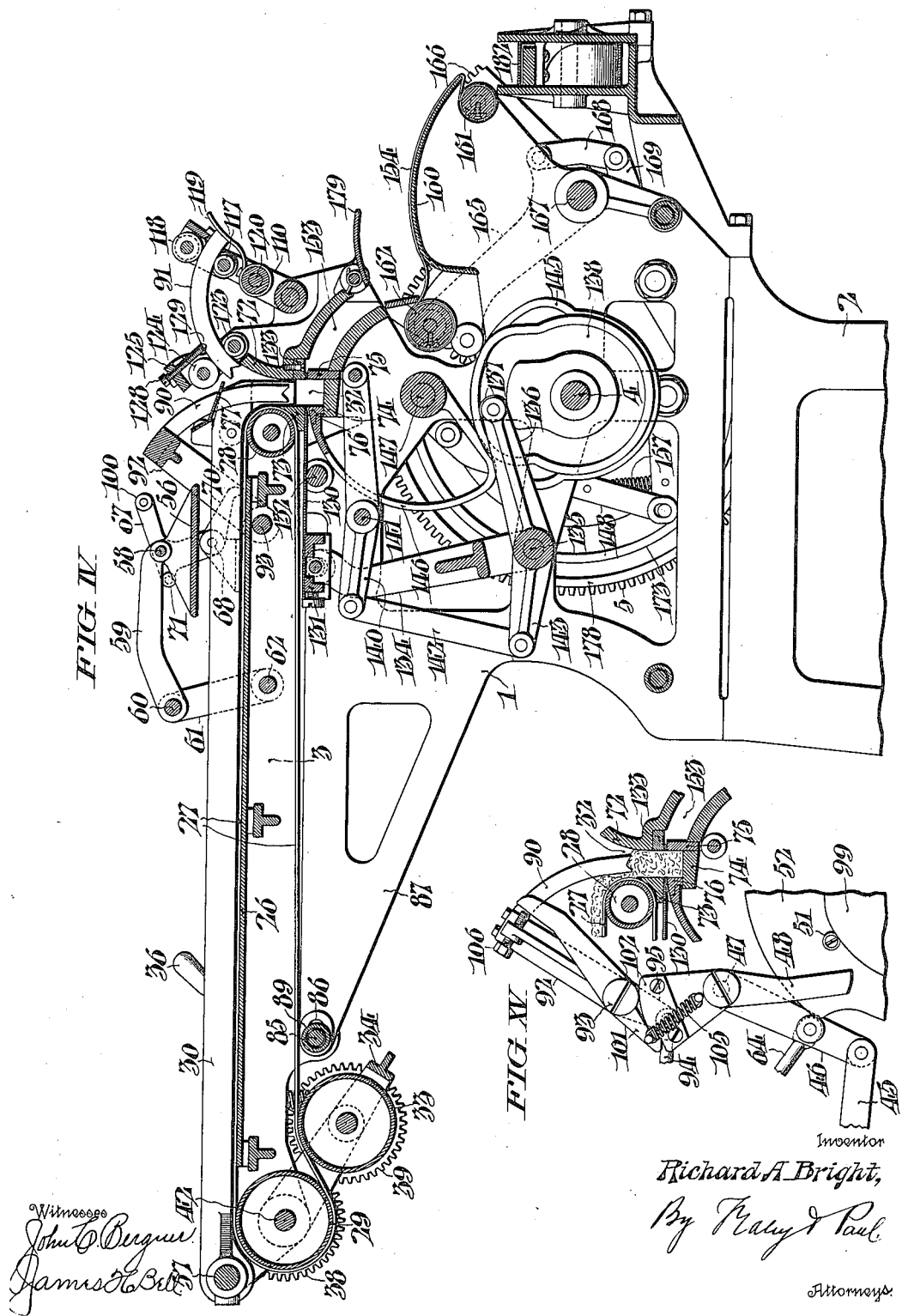

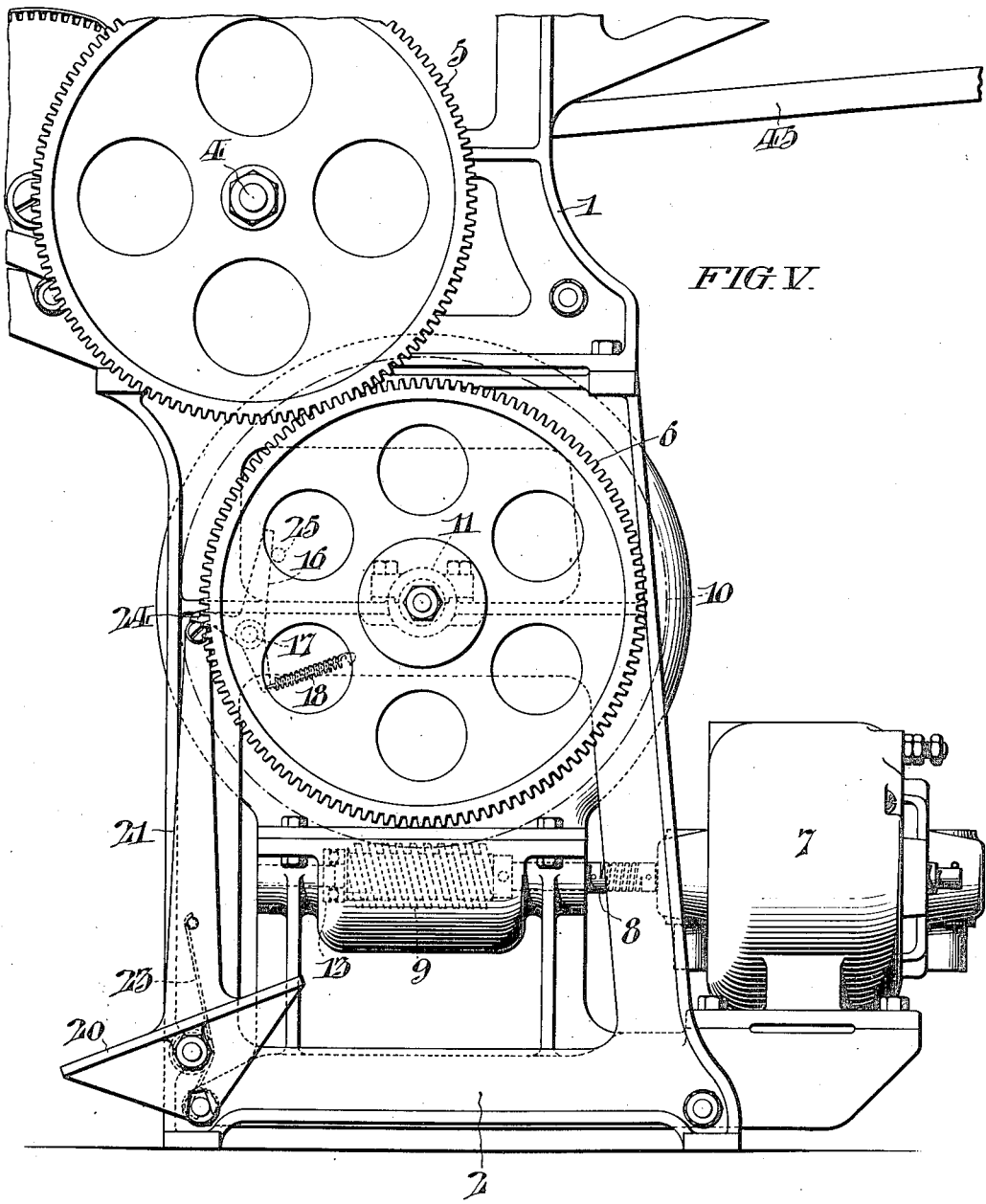

R. A. BRIGHT.
CIGAR MACHINE.
APPLICATION FILED FEB. 18, 1914.
1,260,137.
Patented Mar. 19, 1918.
9 SHEETS—SHEET 6.
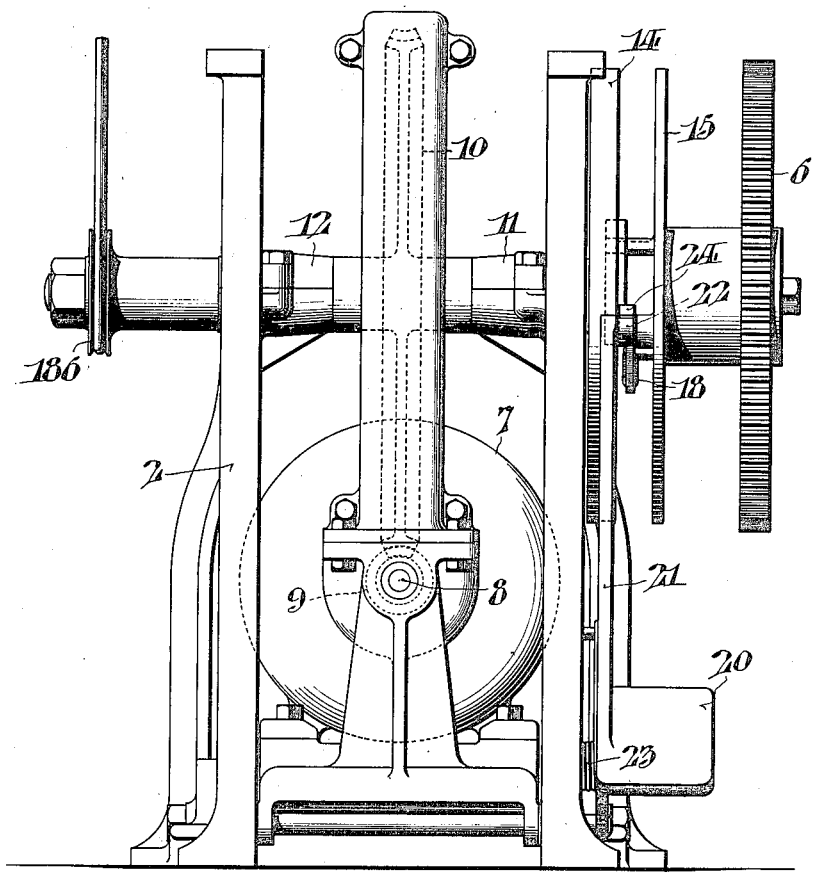
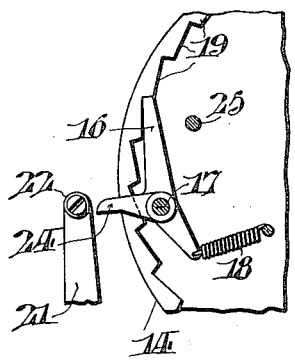
Inventor
Richard A. Bright, R. A. BRIGHT.
CIGAR MACHINE.
APPLICATION FILED FEB. 18, 1914.
1,260,137.
Patented Mar. 19, 1918.
9 SHEETS—SHEET 7.
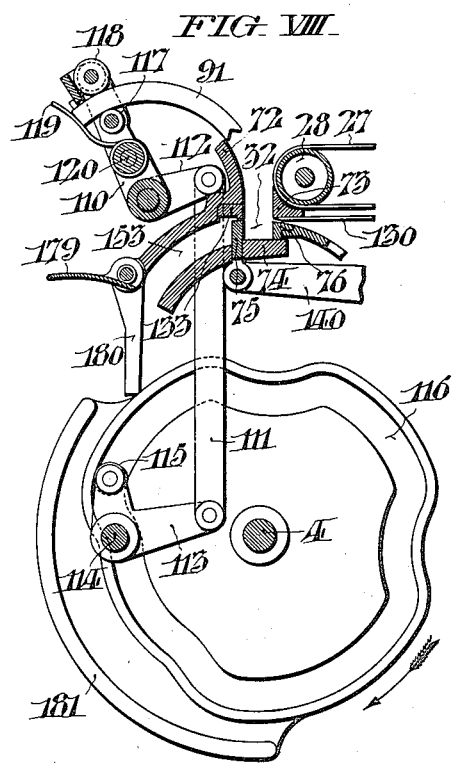
FIG. VIII.
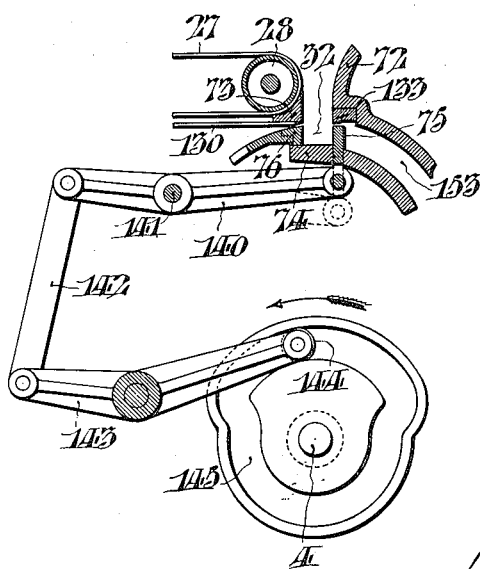
FIG. IX.

R. A. BRIGHT.
CIGAR MACHINE.
APPLICATION FILED FEB. 18, 1914.
1,260,137.
Patented Mar. 19, 1918.
9 SHEETS—SHEET 8.
FIG. X.
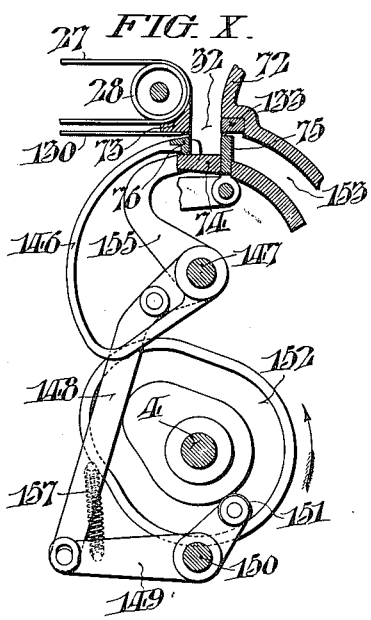
FIG. XI.
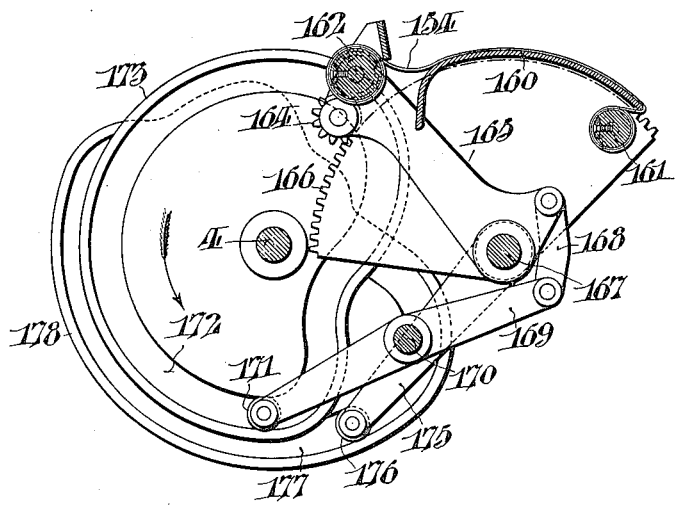
Inventor
Richard A. Bright,
Witnesses R. A. BRIGHT.
CIGAR MACHINE.
APPLICATION FILED FEB. 18, 1914.
1,260,137.
Patented Mar. 19, 1918.
9 SHEETS—SHEET 9.
FIG. XII.
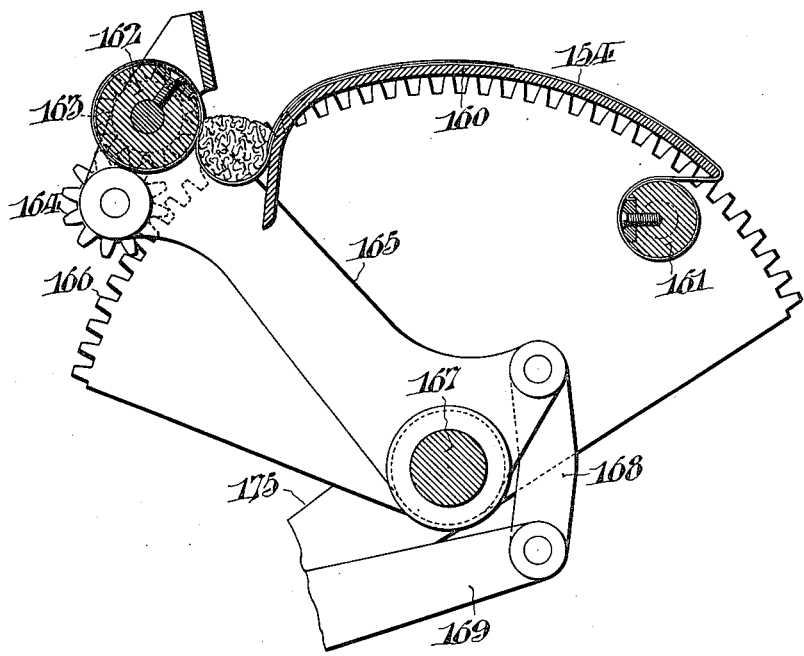
FIG. XIII.
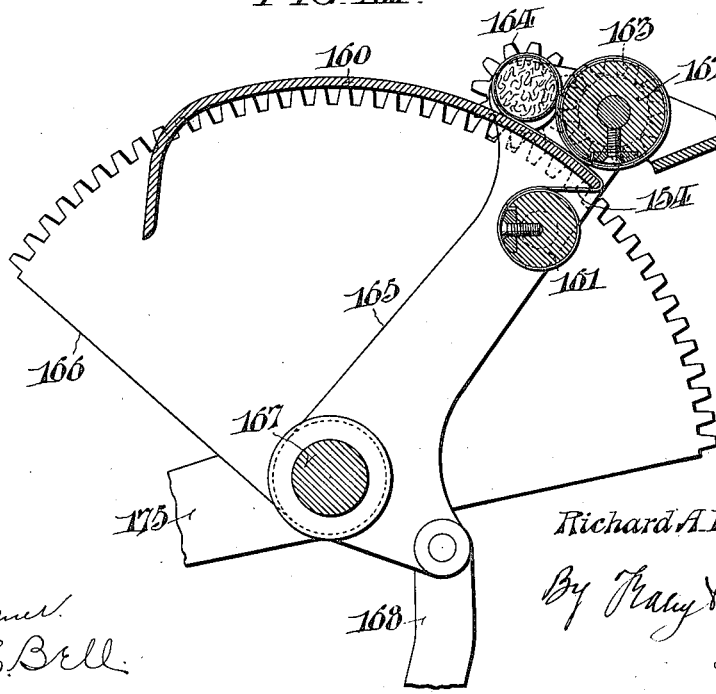
Witnesses
John E. Bergner
James H. Bell
Inventor
Richard A. Bright,
By Maley & Paul
Attorneys

UNITED STATES PATENT OFFICE.

RICHARD A. BRIGHT, OF SOUTH AUBURN, CRANSTON, RHODE ISLAND.

CIGAR-MACHINE.

1,260,137.

Specification of Letters Patent.   Patented Mar. 19, 1918.

Application filed February 18, 1914.   Serial No. 819,300.

*To all whom it may concern:*

Be it known that I, RICHARD A. BRIGHT, residing at South Auburn, Cranston, in the county of Providence and State of Rhode Island, have invented certain new and useful Improvements in Cigar-Machines, whereof the following is a specification, reference being had to the accompanying drawings.

The invention relates more particularly to a machine for bunching the fillers for a cigar and wrapping a binder around the same.

An object of the invention is to provide a cigar bunching machine wherein the filler tobacco is packed in a receiver by devices movable into the receiver and operating alternately with a feeding mechanism for supplying the receiver with the fillers.

A further object of the invention is to provide a machine of the above type with packing devices, wherein the pressure exerted thereby on the filler shall be practically uniform for each unit length of the filler.

A further object of the invention is to provide a receiver in which the bunch is formed, which is so constructed that the filler may be fed and packed therein continuously, that is, while the bunch is being severed and ejected therefrom.

A further object of the invention is to provide a cigar machine wherein the filler may be continuously bunched and packed in a receiver while the bunch is being severed and delivered to the binder wrapping mechanism.

A further object of the invention is to provide means whereby said packing devices can control the feed of the fillers, rendering the same effective or ineffective, so that the receiver will be supplied with the proper amount of fillers.

A further object of the invention is to provide a machine of the above character with a second set of independently yielding devices which are moved into the receiver for further packing the fillers.

A further object of the invention is to provide a presser plate which coöperates with a feeding belt for pressing the fillers, said presser plate being movable with the feed belt to prevent the filler slipping thereon, and to deliver the same to the receiver.

A still further object of the invention is to provide a cutting device which is movable through the receiver for separating the bunch of filler tobacco, which cutting device remains across the receiver until the separated bunch has been ejected from the receiver.

A still further object of the invention is to provide a receiver into which the filler tobacco is packed, which receiver is formed with a gate in one wall thereon, and with an ejector in the opposite wall which operates to convey the separated bunch of fillers from the receiver to the binder-wrapping mechanism.

These and other objects will in part be obvious, and will in part be hereinafter more fully disclosed.

In the drawings, which show by way of illustration one embodiment of the invention, Figure I, is a plan view of a cigar bunch machine embodying the improvements.

Fig. II, is a side elevation of the same.

Fig. III, is a side elevation of the opposite side of the machine from that shown in Fig. II.

Fig. IV, is a longitudinal sectional view through the machine.

Fig. V, is an enlarged detail showing the driving mechanism of the bunch machine.

Fig. VI, is a front view of the lower part of the frame and the actuating mechanism for the main shaft.

Fig. VII, is a detail view showing in section the feed belt, the presser plate and the manner of releasing the presser plate by the packing fingers.

Fig. VIII, is an enlarged detail partly in section, showing the mechanism for actuating the packing fingers, the receiver, the gate, ejector and a portion of the feed belt.

Fig. IX, is an enlarged detail partly in section, showing the mechanism for operating the gate which forms one side of the receiver.

Fig. X, is an enlarged detail partly in section, showing the mechanism for actuating the ejector, and its relation to the receiver and the delivering end of the feed belt.

Fig. XI, is an enlarged detail partly in section, showing the mechanism for operating the apron for wrapping the binder on the bunches.

Fig. XII, is an enlarged detail partly in section, showing the first movement of the bunch-wrapping mechanism.

Fig. XIII, is a view similar to Fig. XII, showing the binder applied to the bunch.

Fig. XIV, is an enlarged detail, showing in side elevation the driving pawl and the controlling arm therefor.

Fig. XV, is a detail partly in section, showing the controlling mechanism for the belt feed.

In carrying out the invention, a cigar bunch machine is provided which includes a receiver into which the filler tobacco is fed by an intermittently operated feed belt, with which coöperates a presser plate adapted to press the filler tobacco down on to the feed belt and move forward with the feed belt to convey the tobacco to the receiver.

The filler tobacco is packed in the receiver by two sets of packing fingers. One set of packing fingers is positively moved away from the receiver and is moved into the receiver under the influence of a spring. The other set of packing fingers which operates alternately with the first set, is positively moved forward into the receiver, but each finger is connected with its mechanism so that it may yield independently. Furthermore, the feed belt which is operated intermittently, is controlled by the first set of packing fingers, so that when the receiver is filled with tobacco the feed mechanism is rendered ineffective.

By this combination of devices, the filler tobacco may be placed in the receiver and uniformly packed therein and in a measure as the cigar-maker packs the filler tobacco in the palm of his hand with his fingers. These packing fingers engaging the filler tobacco and controlling the feed, assure this uniform packing of the filler tobacco and the forming of uniform sized bunches.

After the filled tobacco is placed in the receiver, a knife moves through the receiver to separate the filler tobacco at the bottom of the receiver from that in the upper part, after which this separated bunch is ejected from the receiver and carried to the wrapping mechanism which wraps the binder around the bunch. The bunches are then delivered to a continuously operated conveyer which carries the same away from the machine.

Referring more in detail to the drawings, the invention will be described under several headings around which the mechanism naturally groups.

The driving mechanism.

The bunch machine as illustrated in the drawings consists of a supporting frame which is formed with an upper section 1, and a lower section 2. The upper section 1, carries the main shaft, the operating cams and all the devices which coöperate to form the bunch and wrap the binder around the same. The lower part of the frame carries the driving mechanism which actuates the main shaft.

The main shaft 4, is mounted in suitable bearings in the upper frame 1. This main shaft 4, carries a large gear wheel 5, which meshes with a gear wheel 6. A motor 7, is carried by an extension mounted on the lower frame 2, and this motor is connected by a flexible connection with a shaft 8, carrying a worm 9, which meshes with a worm gear 10, fixed to a shaft mounted in suitable bearings 11, and 12, in the lower frame 2. A suitable ball bearing 13, takes up the endwise thrust of the shaft 8. The worm 9, and the worm wheel 10, are preferably inclosed in a dust-proof casing. The shaft extending through the bearings 11, and 12, on which the worm gear 10, is mounted, carries an internal ratchet wheel 14.

Mounted loosely on this shaft is a pawl plate 15, which carries a pawl 16. The pawl 16, is pivoted at 17, to the plate 15, and a spring 18, normally presses the upper end of the pawl 16, outwardly, so as to cause the same to engage the teeth 19, on the ratchet wheel 14. The gear 6, is fixed to the pawl plate 15, and this pawl plate and gear are loose on a sleeve carried at the outer end of the shaft extending through the bearings 11, and 12.

When the pawl 16, engages the teeth 19, the gear 6, will be connected to the worm gear 10, and will travel with the same. If the pawl 16, is moved out of engagement with the ratchet, then the gear 6, will be uncoupled from the worm gear 10, and will remain idle.

In order that the pawl 16, may be controlled, there is provided a treadle 20, which is pivotally supported by the lower frame 2, and this treadle carries an upwardly extending arm 21, which is provided with a roller 22. A spring 23, normally throws the upper end of the arm 21, to the right, as viewed in Fig. V, and when so positioned an outwardly projecting arm 24, carried by the pawl 16, will strike the roller and this will move the pawl so as to disengage it from the ratchet wheel 14.

A stop pin 25, limits the movement of the pawl 16. When the treadle is swung so as to move the arm 21, outwardly, as viewed in Fig. V, the roller is then withdrawn from the path of travel of the arm 24, and as long as the treadle remains in this position, the gear wheel 6, will continue to rotate.

From the above construction it will be apparent that a driving mechanism has been provided wherein the machine may be manually controlled, so as to make one complete revolution or to move continuously, as desired.

*Mechanism for feeding the fillers.*

Practically all of the mechanism is mounted in a frame 3, which is adjustably bolted to the top of the upper section 1, of the supporting frame. This adjustment is for the purpose of varying the size of the receiver and will be hereinafter more specifically described.

The top frame 3, supports a table 26, over which travels an endless belt 27. This belt runs over a roller 28, at one end of the machine, and a roller 29, at the other end. Extending along the table are guides 30, and 31. These guides are adjustably secured at one of their ends to a rod 57, which extends between the two side members comprised by the frame 3, at the left hand end of the machine as viewed in Fig. IV. The guides serve to centralize the filler upon the feed belt and may be adjusted to accommodate various lengths of filler. The filler tobacco is placed on the traveling feed belt at the left hand end of the machine, as viewed in Fig. IV, and this feed belt causes the filler tobacco to be gradually moved along and finally delivered to the receiver 32.

The feed belt is placed under tension by a roller 33. This roller 33, is carried by a yoke 34. A spring 35, is attached at one end to the yoke, and at the other end to a hand lever 36. This hand lever may be adjusted and held in various adjusted positions by a pin 37, which passes through the hand lever into the frame 3. The spring 35, normally swings the yoke so as to press the roller 33, against the belt, which places said belt under tension, this tension being varied by shifting the hand lever 36. This mechanism for the adjustment of the belt tension is duplicated on the opposite side of the machine, the similar parts being designated by similar reference numerals.

The roller 29, carries a gear 38, which meshes with a gear 39, on the shaft carrying the roller 33, so that the roller 33, is also positively rotated in timed relation with the roller 39. The positive rotation of these two rollers, causes the feed belt to travel without slipping on either roller.

The roller 29, is intermittently actuated by a pawl 40, which engages a ratchet wheel 41, fixed to the shaft 42, on which the roller 29, is mounted. A spring 43, normally holds the pawl 40, in contact with this ratchet wheel. The pawl 40, is mounted on an arm 44, which is freely mounted on the shaft 42. A link 45, is pivoted to the arm 44, and this link at its opposite end is pivoted to the feed lever 46, which is mounted on a cross shaft 47. This cross shaft 47, carries an arm 48, which extends into the path of roller studs 49, 50 and 51, which are spaced on a cam plate 52, fixed to the main cam shaft 4.

Gravity, or a spring, acting upon the lever 46, the link 45, and the arm 44, normally keeps the arm 48, in the path of these roller studs, and as the roller studs contact with the arm 48, the latter will be swung to the left, as viewed in Fig. II, oscillating the cross shaft 47, and thus swinging the arm 44, and intermittently rotating the ratchet wheel 41.

A stop pin 53, limits the movement of the arm 48, toward the roller studs 49, 50 and 51. This pin 53, is carried by a plate 54, which may be adjusted and held in adjusted positions by a pin 55, which engages one of a series of apertures in the top frame 3. By adjusting this plate 54, the length of the stroke of the pawl 40, may be varied, and thus the amount of movement given to the feed belt also varied.

*The presser feed plate.*

Coöperating with the feed belt is a presser feed plate 56, the action of which is illustrated in Fig. VII, of the drawings. This presser feed plate is pivotally supported by a rod 58, which is mounted in arms 59, carried by a cross shaft 60. Shaft 60, is supported by a pair of arms 61 (see Fig. I), which are secured to a cross shaft 62. An arm 63, is fixed to the cross shaft 62, and is pivotally connected to an adjustable link 64, which in turn is pivotally connected to the lever 46.

The presser feed plate 56, is fixed to the cross rod 58, and this cross rod has a limited movement in the outer ends of the arms 59. Mounted on the cross rod is a forked plate 65, which coöperates with a pin 66, on one of the arms 59, and this limits the movement of the presser plate about the axis of the rod 58. The presser feed plate is adapted to move back and forth over the belt 27, and when moving in the same direction with the belt, is in contact with the filler tobacco thereon, so as to compress the same while moving toward the receiver. In the return movement, the presser plate is raised out of contact with the filler tobacco, and this is accomplished by the following mechanism.

An arm 67, is pivoted at 68, to a bracket secured to the frame 3. A spring 69, normally swings this plate so as to bring the finger 70, of the arm 67, into contact with the frame (see Fig. IV). The arm 67, carries a roller 71, which engages one of the arms 59, and operates to raise the presser feed plate 56, away from the filler tobacco on the feed belt, under the action of the spring 69, for the return stroke of the said plate 56. This position of these parts is clearly shown in Fig. IV. The motion of the presser plate 56, is controlled by the packing fingers, as will be hereinafter more fully described, and its active position, i. e., when contacting with the filler tobacco, is illustrated in Fig. VII.

The operation of the presser feed plate is as follows: When the packing fingers are raised from the receiver, the presser feed plate is permitted to move down on the filler tobacco and is caused to move forward with the feed belt through its connection with the feed lever 46, and this compresses the filler and delivers it to the receiver.

*The receiver.*

The filler tobacco is conveyed by the belt 27, to the receiver 32. It will be understood that I use this term "receiver" not as a structural limitation, but with a functional limitation only, meaning thereby merely the place where the filler accumulates to form the bunch. The receiver illustrated, as will appear from the detail description, is not of the ordinary type, wherein the filler is packed and ejected through the same end or opening, but is more in the nature of a throat or channel which is temporarily divided or formed into compartments, one of which may be continuously receiving the filler, while the severed bunch is ejected from the other. This receiver is open at its upper end to receive the filler tobacco. A curved plate 72, secured to the frame 1, forms the outer wall of the receiver, while a plate 73, secured to the frame 3, forms the inner wall of the receiver. A plate 74, forms the bottom of the receiver. This plate 74, is slotted and a gate 75, passes through the slot and forms a part of the outer wall. The opposite wall is partly formed by the head of an ejector 76. A guard plate 77, guides the filler tobacco into the receiver.

From the above description it will be noted that the feed belt 27, and its rollers 28, 29, and 33, the guides 30, and 31, table 26, and receiver wall 73, are all carried by the top frame 3. As already hinted, this frame is adjustably secured to the upper section 1, of the main frame, to vary the size of the receiver for different diameters of cigar bunches. The forward wall 72, of the receiver is fixed, and the gate 75, is also stationary as far as lateral movement is concerned. An adjustment of the wall 73, will, therefore, result in varying the size of the receiver. This adjustment is effected by bolts 80, which pass through the slots 81, formed in lugs 82, formed on frame 3, and are secured in corresponding lugs 83, on the upper section 1, of the main frame.

Near its left hand end (Figs. II and IV) the frame 3, is provided at each side of the machine with a depending lug 84, through which passes a tie rod 85. This rod also passes through slots 86, formed in the ends of the extensions 87, of the main frame 1, and is provided at its ends with nuts 88. The rod 85, is encircled between the extensions 87, of the main frame 1, by a spacing sleeve 89. This last described construction will therefore also permit the lateral adjustment of the top frame 3, with respect to the main frame 1, for varying the size of the receiver. The head 76, of the ejector is also moved automatically to conform to the adjustment of the receiver, by a mechanism which will be hereinafter more fully described.

*The packing fingers.*

The filler tobacco is packed in the receiver by two sets of packing fingers 90, and 91. The packing fingers 90, are fixed to a yoke 92, which is pivoted at opposite sides of the frame 3, as indicated at 93. The mechanism for operating this set of fingers is best shown in side elevation in Fig. II. The yoke 92, at one side thereof has a downwardly extending arm 95, shown in dotted lines in Fig. II, which is connected to an adjustable link 94. This adjustable link at its opposite end is pivoted to a rock lever 96, which is fulcrumed at 97, on the upper section 1, of the frame.

The opposite end of the rock lever 96, carries a roller 98, which coöperates with a cam 99, mounted on the main cam shaft 4. This cam as herein shown is formed with three depressions, so that as the shaft rotates once, the rock lever will be oscillated three times, thus giving three intermittent movements to the packing fingers 90. The guard plate 77, is slotted to permit these fingers to pass through the same. When the packing fingers 90, are moved to the upper end of their stroke, the yoke contacts with a roller 100, carried by the arm 67, above described, and thereby swings the said arm, to release the presser feed plate. This allows the presser plate to drop by gravity into contact with the filler tobacco and to move forward therewith when the packing fingers are raised.

Mounted on the pivotal support for the yoke 92, is a pawl 101, (see Figs. II and XV), which is adapted to engage a notched plate 102, fixed to an extension of the feed lever 46. A spring 105, normally moves this pawl into locking engagement with the notched plate 102. The packing fingers 90, are moved out of the receiver positively by a swinging of the rock lever 96, through the action of the cam 99. These packing fingers are moved into the receiver through the weight of the fingers, and through a spring 103.

The distance the fingers would move into the receiver will, therefore, depend upon the amount of filler tobacco in the receiver. In other words, when the receiver is packed full, then the stroke of the packing fingers 90, will be shortened, as these fingers are moved forward solely through the weight of the same and the action of the spring, as above described.

The yoke carrying the fingers 90, also carries an adjustable bolt 106, which is located so as to engage the outer end of the pawl 101, when the packing fingers move into the receiver a sufficient distance. In other words, when the receiver is substantially empty, the packing fingers will move down into the receiver, so as to engage the pawl 101, and release the feed lever, so it will be swung back and engaged by the roller studs 49, 50 and 51 in turn, and thereby an intermittent feed given to the conveyer belt.

As soon, however, as the receiver becomes filled with tobacco, the stroke of the packing fingers will not be sufficient to release the pawl 101, which will, therefore, engage the plate 102, and hold the feed lever 46, from returning, so as to be actuated by the roller studs above referred to (see Fig. XV). In other words, this pawl 101, actuated by the movement of the packing fingers 90, controls the feed of the feed belt, so that when the receiver is filled, the feed will be rendered ineffective, and as soon as the receiver is emptied, then the feed will be again started into action. Inasmuch as the presser plate is also actuated by the feed lever 46, in its forward movement, it will also be rendered ineffective when the feed of the feed belt ceases.

The packing fingers 91, are disposed so as to move between the packing fingers 90 (see Fig. I). These packing fingers 91, are carried by a swinging frame 110. This swinging frame 110, is oscillated by a link 111, which is connected to an arm 112, projecting from the frame 110, and at its other end is connected to a rock lever 113, pivoted at 114, to the main frame 1, and carrying a roller 115, which coöperates with a groove cam 116, mounted on the main cam shaft 4.

The swinging frame 110, carries opposed guide rollers 117, and 118, between which the presser fingers 91, are freely mounted. A spring 119, engages each finger. These springs are carried by a shaft 120. On the end of the shaft is a ratchet wheel 121, which is locked by a pawl 122. By turning the ratchet wheel 121, the pressure of the springs 119, against the packing fingers 91, may be varied.

The inner end of the packing fingers is guided by a grooved roller 123, and a roller 124, which rests against the outer face of the fingers. These rollers 123, and 124, are mounted in a bracket 125, carried by the frame 1.

From the above description it will be apparent that these packing fingers 91, are moved into the receiver by the positive swinging of the frame 110. Each finger, however, is independently mounted so it can yield, and these fingers will, therefore, place upon the filler tobacco a uniform pressure throughout the length of the bunch, regardless of the amount of filler tobacco in the receiver. In other words, the filler tobacco at the lower end of the receiver will be uniformly compressed by these packing fingers 91, and this compression of the filler tobacco may be varied by adjusting the tension on the various springs 119, as above described.

When it is found necessary or desirable, any one of the feed fingers 91, may be rendered inoperative by releasing its spring 119, from the shaft. Set screws 128, are also provided and adapted to engage notches 129, in the fingers 91, and thereby retain these fingers in retracted or idle position upon release of the springs as noted above.

*The cutting mechanism.*

After the filler has been packed in the received by the packing fingers 90, and 91, a cutter 130, moves through the receiver over the top of the ejector 76, and the top of the gate 75. This cutter consists of a cutting blade which is carried by a head 131. The blade rests on a roller 132. There is a coöperating ledger blade 133, which aids in the final severing of the bunch.

The cutter head 131, is reciprocated by a lever 134, which is pivoted to swing on a cross rod 135.

An arm 136, swings the arm 134. This arm 136, carries a roller 137, which runs in a cam groove 138, in a disk mounted on the main cam shaft 4. This cam groove is so constructed as to reciprocate the cutter once for each complete rotation of the shaft 4. The cutter is so located relative to the receiver that it moves through the receiver, cutting from the filler packed in the receiver a bunch sufficient for one cigar. It is the lower part of the filler tobacco in the receiver that is severed, and this lower part of the filler tobacco will be uniformly compressed throughout, regardless of the amount of tobacco in the receiver, and, therefore, the bunch severed by the cutting knife will be of uniform compression throughout its entire length.

*The ejector mechanism.*

After the bunch is severed from the filler tobacco it is ejected from the receiver. The gate 75, forming one wall of the receiver is carried by a lever 140. This lever 140, is pivoted at 141, and is connected at its outer end to a link 142 (see Fig. IX). The link 142, is pivoted in turn to a rock lever 143, which carries a roller 144, running in a cam 145, formed in a cam disk on the main cam shaft 4. The cam 145, is so constructed as to lower the gate once for each complete rotation of the main cam shaft 4.

The ejector 76, is carried by swinging arms 146, secured on shaft 147 (see Fig. X). This arm is swung by a link 148, which is pivotally connected to a rock lever 149, mounted at 150, and carrying a roller 151, coöperating with a face cam 152, in a cam disk on the main cam shaft 4. This face cam is so constructed as to cause the ejector to move forward once for each complete rotation of the shaft 4. After the gate is lowered, the ejector is moved forward and carries the severed bunch into a channel 153, which directs the bunch on to the apron 154. The shaft 147, upon which is secured the ejector 146, is provided with a finger 155, which engages a plate 156, secured to the left hand end of frame 3 (see Fig. III).

When the frame 3, is adjusted to vary the size of the receiver, the ejector will therefore also be correspondingly moved by reason of the connection with finger 155. This adjustment is possible without affecting the extent of throw of ejector by the cam 152, by reason of the slotted connection at the lower end of link 148, with the arm 149. A spring 157, attached at one end to the link 148, and at the other end to the arm 149, compensates for the adjustment of the ejector by means of finger 155.

From the above description it will be apparent that the receiver 32, is in a sense a continuous channel or throat leading from the feed belt to the binding mechanism. The gate 75, divides this throat or channel so as to form a receiver for the filler in which the filler accumulates and is packed to form the bunch. The cutter 130, when it moves forward also divides this throat or channel into compartments; the one above the cutter may be continuously supplied with the filler which is packed therein, while the one below the cutter contains the severed bunch which may at this time be ejected.

*The binder wrapping mechanism.*

This mechanism comprises an apron 154, which normally rests upon the top of a table 160. This normal position of the apron is shown in Fig. XI. One end of the said apron is wound upon a rod 161, which is mounted in the frame of the machine, and capable of rotary adjustment to vary the length of the apron. This adjustment is accomplished by means of a thumb knob 190, secured to one of the trunnions upon which the rod 161, is mounted, as best seen in Fig. II. A pointer 191, coöperating with a dial secured to the side of the frame serves to record the adjustment of the rod in varying the length of the apron.

The other end of the apron is secured to a roller 162, which is supported at the outer end of arms 165, loosely mounted on the shaft 167. The roller 162, is provided with a pinion 163, which is rotated by means of a gear sector 166, through the interposition of a pinion 164, also carried by the arm 165.

The said arm 165, is adapted to be oscillated by means of a link 168, which is pivotally attached to the end of a lever 169, fulcrumed at 170 (Fig. XI). Lever 170, carries a roller 171, which coöperates with a cam groove 172, in the disk 173, mounted on the main shaft 4.

The gear segment 166, is loosely mounted on the shaft 167, and is provided with an arm 175, carrying at its outer end a roller 176, which coöperates with a cam groove 177, in disk 178, also mounted upon the main shaft 4. The operation of the binder wrapping mechanism is as follows:

Referring to Fig. XI, the roller 162, to which one end of the apron 154, is secured, has just returned to normal position after discharging a wrapped bunch and the said apron is at this time fairly well stretched across the table 160, as practically all the slack is wound upon the roller 162. This is for the express purpose of preventing the slack of the apron falling at the outer end of the table at the region of the rod 161. The wrapper leaf is placed by the operator upon the apron 154, so that the end thereof reaches well into the pocket formed in the said apron.

As the ejector 76, advances the severed bunch down the channel 153, and when the said bunch approaches the apron 154, gear segment 166, is moved in the direction of the arrow (Fig. XI) by means of a cam groove 177. This improvement causes the roller 162, to unroll the apron to form a deep pocket for receiving the bunch. This position of the parts is illustrated in Fig. XII. As soon as the bunch is deposited in this deep pocket, the arm 165, moves forward under the influence of cam groove 172, while the gear segment 166, moves backward slightly under the influence of its cam groove 177.

The relation of the cams 172, and 177, is such as to bring about this complex motion at the proper time, and which results in contracting the pocket in the apron to nearly the desired size of the finished bunch. Subsequently the segment 166, and the arm 165, move forward, under the influence of their respective cams, in such relation as will effect a slight takeup on the apron 154, so that the diameter of the pocket following behind the roller 162, as shown in Fig. XIII, is gradually decreased. Near the end of the rolling motion another relative movement takes place between the arm 165, and sector 166, due to the peculiar shape of the cam grooves 172, and 177, such that the wrapped bunch is discharged over the end of the table 162. These parts are then returned, and in this backward motion the slack in the apron is again taken up so that the parts again finally assume the relative positions shown in Fig. XI.

*The conveyer.*

The wrapped bunches are received by an endless conveyer 182, which runs over suitable rollers and is driven by a belt wheel 183. A belt 184, runs over idlers 185, and the belt wheel 183. This belt 184, is driven by a belt wheel 186, on the end of the shaft carrying the worm gear 10. This shaft is operated continuously, so that the conveyer for the wrapped bunches will be operated continuously to convey the same away from the machine.

*The operation of the machine.*

The operation of the machine will be obvious from the above description. The filler tobacco is placed on the feed belt at the left hand end of the machine, as viewed in Fig. IV. If long filler tobacco is used, it should be placed in a direction transverse of the feed belt. The filler tobacco is carried along by the feed belt to the receiver 32. The presser plate is moved down on to the filler tobacco, compressing the same as the packing fingers 90, are raised from the receiver. This presser plate moves forward with the feed belt as it is coupled to the actuating mechanism therefor, and prevents the filler slipping on the belt.

The filler tobacco is packed in the receiver by the co-action of the packing fingers 90, and 91. These packing fingers 90, are positively raised from the receiver, and are moved into the same by the spring 103. The distance the packing fingers are moved into the receiver will be determined, therefore, by the amount of filler tobacco in the receiver. The feeding mechanism is controlled by the movement of these packing fingers.

The pawl 101, is spring-pressed, so as to normally lock the feed lever and prevent the feeding of the belt. This pawl is released by the downward movement of the packing fingers, when said packing fingers move a considerable distance into the receiver.

When the receiver is filled, then the packing fingers do not move a sufficient distance into the receiver to release the pawl 101, and, therefore, the feed will be held ineffective. By adjusting the screw bolt 106, the time of releasing the pawl 101, may be varied.

The packing fingers 91, are carried by a positively moved frame, but each of these packing fingers is yieldingly mounted so that it will be pressed against the filler tobacco by separate yielding devices, and, therefore, the filler tobacco at the bottom of the receiver will be uniformly packed by these fingers, even though one portion of the receiver contains a greater amount of filler tobacco than another.

The packing fingers operating upon the filler tobacco in a sense "feel" the compression of the filler tobacco and control the feed so that the bunches formed will be of uniform size and of uniform compression. These packing fingers are preferably operated so as to be actuated three times in the forming of a single bunch, or during one rotation of the main shaft. The knife, or cutter, passes through the receiver, separating from the filler tobacco in the receiver a bunch sufficient for one cigar from the lower portion thereof. This separated bunch is then ejected, the gate 75, swinging down out of the way to permit the ejector 76, to force the bunch from the receiver through the channel 153, on to the binder which is placed on the apron 154.

The movement of the ejector is sufficient to carry the severed bunch through the channel onto the binder wrapping apron forcing the bunch down into the pocket formed in the apron.

As the roller starts forward to wind the wrapper onto the bunch, the movement of the segment gear is timed so as to take up the apron to restrict the size of the pocket to substantially the size of the desired wrapped bunch and the binder will therefore compress the filler slightly as it is wrapped thereon. As the roller approaches the end of its travel and the finishing of the wrapping occurs, the segment is again moved to release the wrapped bunch, so that it may be readily delivered into the conveyer. After the wrapped bunch is delivered into the conveyer and the roller is returning to its position for receiving another bunch, the segment gear is moved so as to prevent the apron from dropping over the end of the table. This lays the apron substantially taut across the top of the table and permits the apron to be readily taken up during the first part of the wrapping movement of the apron.

From the above description it will be apparent that a cigar bunch machine has been devised which is in a sense a continuous operative machine, that is while the filler is being fed into the filler retaining device or receiver and packed therein by the movable fingers a bunch may be severed from the filler and ejected from the filler retaining device or receiver, so that a bunch may be severed and ejected simultaneously with the forming of subsequent bunches. This greatly increases the speed of the production of the machine. When the knife is across the receiver, it dwells a sufficient length of time to permit the ejector to move to the end of its stroke for ejecting the severed bunch and return, and during this time the filler is being packed on top of the knife.

The operator by controlling the treadle may set the parts into action, and stop the machine, after a single rotation of the shaft. This permits the operator to place the binder, and as soon as it is in proper place on the apron, to set the parts into action to deliver on to the binder a bunch to be wrapped, stopping the machine after the bunch is wrapped, for the placing of another binder, if found necessary.

It is obvious that minor changes in the details of construction and the arrangement of the parts may be made, without departing from the spirit of the invention as set forth in the appended claims.

Having thus described my invention, I claim:

1. A cigar bunch machine, including a filler retaining device into which the filler may be fed; means for severing the filler to form a bunch; and means for ejecting the severed bunch, said means being capable of operation while the filler is being fed into the upper portion of said filler retaining device.

2. A cigar bunch machine including a filler retaining device, means for feeding the filler into said retaining device, means for packing the filler in said retaining device, means for severing the filler to form a bunch, and means for ejecting the severed bunch, said means being capable of operation while the filler is being fed and packed in the upper portion of said filler retaining device.

3. A cigar bunch machine including a filler retaining device, means for feeding the filler into said retaining device, means for packing the filler in said retaining device, including devices for controlling the feed, means for severing the filler to form a bunch, and means for ejecting the severed bunch, said means being capable of operation while the filler is being fed and packed in the upper portion of said filler retaining device.

4. A cigar bunch machine including a filler retaining device, a knife adapted to move across said retaining device for severing the filler therein to form a bunch, means operable independently of the knife for ejecting the severed bunch from beneath the knife, means for operating the knife and for giving a dwell thereto while the severed bunch is being ejected.

5. A cigar bunch machine including a filler retaining device, a knife adapted to move across said retaining device for severing the filler therein to form a bunch, means for ejecting the severed bunch from beneath the knife, means for operating the knife and for giving a dwell thereto while the severed bunch is being ejected; means for feeding the filler into said filler retaining device above said knife, and means movable into said retaining device for packing the filler therein, said packing means being operative while said knife extends across the filler retaining device.

6. A cigar bunch machine including a filler retaining device into which the filler may be fed, means for packing the filler in said retaining device, a knife, means for moving the knife so as to separate said retaining device into two compartments, one containing the severed bunch and the other containing the filler to form subsequent bunches, and means operable independent of the knife for ejecting the severed bunch from its compartment.

7. A cigar bunch machine including a receiver, intermittently and alternately actuated devices movable into the receiver for packing the filler in said receiver, and a cutter movable through the receiver for separating the bunch from the filler.

8. A cigar bunch machine including a receiver, intermittently and alternately actuated devices movable into the receiver for packing the filler in said receiver, a cutter movable through the receiver for separating the bunch from the filler, and devices for ejecting the severed bunch from the receiver.

9. A cigar bunch machine including a receiver, intermittently and alternately actuated devices movable into the receiver for packing the filler in said receiver, a cutter movable through the receiver for separating the bunch from the filler, means for reciprocating said cutter, and devices for ejecting the severed bunch prior to the retracting of the cutter.

10. A cigar bunch machine including a receiver, packing devices movable into the receiver for packing the filler into the receiver, and means for positively moving said packing devices out of said receiver, said means being constructed to permit said devices to be moved yieldingly into said receiver.

11. A cigar bunch machine including a receiver, a plurality of sets of packing fingers movable alternately into said receiver for compressing the filler, and a cutter for severing the filler to form a bunch from the filler at the bottom of the receiver, and means for ejecting the severed bunch.

12. A cigar bunch machine including a receiver, intermittently and alternately actuated devices movable into the receiver for packing the filler in said receiver, means for severing the filler in the receiver to form a bunch in the bottom thereof, and devices for removing the severed bunch.

13. A cigar bunch machine including a receiver, intermittently and alternately actuated devices movable into the receiver for packing the filler in said receiver, means for severing the filler in the receiver to form a bunch in the bottom thereof, said receiver having a gate at one side of the bottom thereof, and means for ejecting the severed bunch through the gate.

14. A cigar bunch machine including a receiver, devices for packing the filler in the receiver, means for severing the filler to form a bunch in the bottom of the receiver, and means operable independently of said severing means for ejecting the severed bunch from the receiver.

15. A cigar bunch machine including a receiver, means for packing the filler in said receiver, a cutter passing through the receiver for forming a bunch in the bottom of the receiver, one side of said receiver having a gate formed therein, and means operable independently of said cutter for ejecting the severed bunch through said gate.

16. A cigar bunch machine including a receiver, means for feeding filler into said receiver, independent means for packing the filler in the receiver, and devices actuated by said packing means for controlling the feed.

17. A cigar bunch machine including a receiver, means for feeding filler into said receiver, independent means for packing the filler in the receiver, and means for severing the filler to form a bunch in the bottom of the receiver and for removing said severed bunch from the receiver.

18. A cigar bunch machine including a receiver, means for feeding filler into said receiver, means for packing the filler in the receiver, devices controlled by said packing means for rendering the feeding mechanism effective or ineffective.

19. A cigar bunch machine including a receiver, means for feeding filler into said receiver, means for packing the filler in the receiver, devices controlled by said packing means for rendering the feeding mechanism effective or ineffective, a severing device passing through the receiver for forming a bunch in the bottom of the receiver, and means for ejecting said severed bunch from the receiver.

20. A cigar bunch machine including a receiver, means for feeding filler into said receiver, devices for packing the filler in the receiver, a movable gate for closing one side of the bottom of the receiver, a cutter for severing the filler to form a bunch in the bottom of the receiver, an ejector, and devices for opening the gate and operating the ejector to force the severed bunch from the receiver.

21. A cigar bunch machine including a receiver, a feed belt for feeding filler into the receiver, a presser plate coöperating with the belt for pressing and feeding the filler forward, packing fingers for packing the filler in the receiver, and devices controlled by the packing fingers for rendering said feeding belt and presser plate effective or ineffective.

22. A cigar bunch machine including a receiver, means for feeding filler into said receiver, a plurality of sets of packing fingers operating alternately to pack the filler in the receiver, a cutter for passing through the receiver for forming a bunch in the bottom of the receiver, and means for ejecting the severed bunch from the receiver.

23. A cigar bunch machine including a receiver, means for feeding filler into the receiver, a set of packing fingers, and means for yieldingly forcing each finger independently into contact with the filler for packing the filler in the receiver.

24. A cigar bunch machine including a receiver, means for feeding filler into the receiver, a set of packing fingers, means for yieldingly forcing each finger independently into contact with the filler for packing the filler in the receiver, means for severing the filler to form a bunch in the bottom of the receiver, and means for ejecting said severed bunch from the receiver.

25. A cigar bunch machine including a receiver, means for feeding filler into the receiver, a plurality of sets of packing fingers, means for independently actuating said sets of fingers, one of said sets of fingers having devices for independently and yieldingly pressing each finger against the filler.

26. A cigar bunch machine including a receiver, means for feeding filler into the receiver, a plurality of sets of packing fingers, means for independently actuating said sets of fingers, one of said sets of fingers having devices for independently and yieldingly pressing each finger against the filler, a cutting blade passing through the receiver for forming a bunch in the bottom of the receiver, and means for ejecting said severed bunch from the receiver.

27. A cigar bunch machine including a receiver, means for feeding filler into the receiver, packing fingers for packing the filler in the receiver, and devices controlled by said packing fingers for actuating said feeding mechanism.

28. A cigar bunch machine including a receiver, means for feeding filler into the receiver, packing fingers for packing the filler in the receiver, devices controlled by said packing fingers for actuating said feeding mechanism, a separate set of packing fingers operating alternately with said first named fingers, a positively actuated frame carrying said second set of fingers, and means for independently and yieldingly moving each of the second set of fingers on said swinging frame.

29. A cigar bunch machine including a receiver, means for feeding filler into the receiver, packing fingers for packing the filler in the receiver, devices controlled by said packing fingers for actuating said feeding mechanism, a separate set of packing fingers operating alternately with said first named fingers, a positively actuated frame carrying said second set of fingers, means for independently and yieldingly moving each of the second set of fingers on said swinging frame, a cutter, means for reciprocating said cutter through the receiver for severing a bunch of filler and means for ejecting said severed bunch from the receiver.

30. A cigar bunch machine including a receiver, a feed belt for feeding filler into said receiver, devices for intermittently actuating said feed belt including an intermittently driven roll, and a second roll geared to and actuated by said first named roll for placing a tension on said feed belt.

31. A cigar bunch machine including a receiver, a feed belt for feeding filler into said receiver, devices for intermittently actuating said feed belt including an intermittently driven roll, a second roll geared to and actuated by said first named roll for placing a tension on said feed belt, means for adjusting the movement of the feed belt, and means for adjusting the tension on the belt.

32. A cigar bunch machine including a table, a feed belt movable on said table, a receiver into which the filler is delivered by said feed belt, a cutter for severing the filler to form a bunch in the bottom of the receiver, an ejector for ejecting the severed bunch from the receiver, packing fingers movable into said receiver for packing the filler in the receiver, a supporting frame for the table and feed belt, and means whereby said frame may be adjusted to vary the size of the receiver.

33. A cigar bunch machine including a table, a feed belt movable on said table, a receiver into which the filler is delivered by said feed belt, a cutter for severing the filler to form a bunch in the bottom of the receiver, an ejector for ejecting the severed bunch from the receiver, packing fingers for packing the filler in the receiver, a supporting frame for the table and feed belt, means whereby said frame may be adjusted to vary the size of the receiver, said ejector having an arm in contact with the said supporting frame whereby the ejector is automatically adjusted to accord with the size of the receiver.

34. A cigar bunch machine including a receiver, a feed belt for feeding filler into the receiver, a presser feed plate coöperating with said feed belt, means for reciprocating said presser feed plate, packing fingers for packing the filler in said receiver, and devices whereby said packing fingers when retracted operate to allow said presser plate to move into contact with the filler.

35. A cigar bunch machine including a receiver, a feed belt for feeding filler into the receiver, packing fingers for packing the filler into the receiver, a cutter passing through the receiver for severing the filler and forming a bunch in the bottom thereof, an ejector for ejecting the severed bunch from the receiver, an apron on which the binder may be placed, means for directing the severed bunch on to said binder on the apron, and means for actuating the apron for wrapping the binder around the bunch.

36. A cigar bunch machine including a receiver, a feed belt for feeding filler into the receiver, packing fingers for packing the filler into the receiver, a cutter passing through the receiver for severing the filler and forming a bunch in the bottom thereof, an ejector for ejecting the severed bunch from the receiver, an apron on which the binder may be placed, means for directing the severed bunch on to said binder on the apron, means for actuating the apron for wrapping the binder around the bunch, all of said operating parts being actuated from a common driving shaft, and means under the control of the operator, whereby said driving shaft may be stopped at each complete rotation.

37. A cigar bunch machine comprising means for forming a filler bunch and mechanism for wrapping a binder on said bunch including an apron, a wrapping roller attached to said apron, a segment gear for rotating said roller, means for bodily traveling said roller on said segment gear, and means for moving the segment gear for decreasing the size of the wrapping pocket during the first part of the rotating operation.

38. A cigar bunch machine comprising means for forming a filler bunch and mechanism for wrapping a binder on said bunch including an apron, a wrapping roller attached to said apron, a segment gear for rotating said roller, means for bodily traveling said roller on said segment gear, and means for moving the segment gear for decreasing the size of the wrapping pocket during the first part of the rotating operation, and means for moving the segment to increase the size of the pocket at the end of the wrapping operation.

39. In a cigar bunch wrapping machine, including in combination a supporting table, a wrapping apron, a wrapping roller attached to one end of said apron, a gear carried by said roll, a segment gear meshing with said gear carried by the wrapping roll, means for bodily traveling said gear in said segment, and means for moving the segment gear during the travel of the wrapping roll.

40. In a cigar bunch wrapping machine, including in combination a supporting table, a wrapping apron, a wrapping roller attached to one end of said apron, a gear carried by said roll, a segment gear meshing with said gear carried by the wrapping roll, means for bodily traveling said gear in said segment, and means for moving the segment gear during the travel of the wrapping roll, said last mentioned means being so timed as to decrease the size of the wrapping pocket during the first part of the bodily travel for the wrapping roll.

41. In a cigar bunch wrapping machine, including in combination a supporting table, a wrapping apron, a wrapping roller attached to one end of said apron, a gear carried by said roll, a segment gear meshing with said gear carried by the wrapping roll, means for bodily traveling said gear in said segment, and means for moving the segment gear during the travel of the wrapping roll, said last mentioned means being so timed as to decrease the size of the wrapping pocket during the first part of the bodily travel of the wrapping roll and to draw the apron taut across the table during the first part of the return movement of the wrapping roll.

In testimony whereof, I have hereunto signed my name, at Philadelphia, Pennsylvania, this sixteenth day of February, 1914.

RICHARD A. BRIGHT.

Witnesses:
JAMES H. BELL,
E. L. FULLERTON.